(12) United States Patent
Nishikawa et al.

(10) Patent No.: US 8,969,749 B2
(45) Date of Patent: Mar. 3, 2015

(54) PUSH AND LOCK UNIT AND INPUT DEVICE USING THE SAME

(71) Applicant: Panasonic Corporation, Osaka (JP)

(72) Inventors: Hisashi Nishikawa, Shiga (JP); Shinya Sato, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 295 days.

(21) Appl. No.: 13/688,651

(22) Filed: Nov. 29, 2012

(65) Prior Publication Data

US 2013/0139621 A1    Jun. 6, 2013

(30) Foreign Application Priority Data

Dec. 6, 2011    (JP) ................. 2011-266586
May 31, 2012    (JP) ................. 2012-124098

(51) Int. Cl.
*H01H 13/58*      (2006.01)
*F16H 25/12*      (2006.01)
*G05G 7/08*       (2006.01)
*H01H 3/08*       (2006.01)

(52) U.S. Cl.
CPC ............. *F16H 25/125* (2013.01); *G05G 7/08* (2013.01); *H01H 2003/085* (2013.01)
USPC .................. 200/526; 200/520; 200/530

(58) Field of Classification Search
CPC ........ H01H 13/56; H01H 13/58; H01H 13/02
USPC .................. 200/520–526, 527–531
See application file for complete search history.

(56) References Cited

U.S. PATENT DOCUMENTS

| 4,319,106 A  * | 3/1982 | Armitage .................. 200/526 |
| 5,132,499 A  * | 7/1992 | Valenzona et al. ......... 200/526 |
| 6,621,028 B1 * | 9/2003 | Bartok ..................... 200/529 |

FOREIGN PATENT DOCUMENTS

JP          2009-059578         3/2009

* cited by examiner

*Primary Examiner* — Amy Cohen Johnson
*Assistant Examiner* — Marina Fishman
(74) *Attorney, Agent, or Firm* — Panasonic Patent Center

(57) ABSTRACT

A push & lock unit includes cam sections mounted on an outer wall of a rotary body that is disposed on an underside of an operating body, and each one of the cam sections contacts a saw-tooth section disposed on a lower end of a rib on an inner wall of a cover and a projection disposed at a bottom center of a housing in response to an up and down movement of the operating body, whereby the rotary body is rotated. When the operating body is pushed, a push face thereof is locked at a position almost flush with an outer face of a panel. When the operating body is pushed once more, it is released from the lock, and restores to a state where the operating body projects from the outer face of the panel.

3 Claims, 8 Drawing Sheets

US 8,969,749 B2

PUSH AND LOCK UNIT AND INPUT DEVICE USING THE SAME

BACKGROUND

1. Technical Field

The technical field relates to a push & lock unit to be used chiefly for operating a variety of electronic devices installed in a car, and it also relates to an input device using the same push & lock unit.

2. Background Art

In recent years, a greater number of input devices have been installed on an instrument panel or a console box of a car interior, and these input devices are operable in various ways. Such input devices permit a driver to operate various electronic devices, e.g. headlights, car audio equipment, or a car air-conditioner with those. Those input devices thus need to be used simply and operated reliably.

SUMMARY

A push & lock unit according to various embodiments includes a cover, a hollow operating body, a ring-shaped rotary body, an operating shaft, a spring, and a housing. The cover has a cylindrical shape and includes multiple grooves and ribs formed alternately on an inner wall of the cover along the circumferential direction. The cover has an opening. The operating body is accommodated inside the cover along a first direction movably, and includes a push face projecting from the opening of the cover. The rotary body is mounted rotatably to the operating body at an opposite end to the push face, and has a cam section projecting outward from the outer wall of the rotary body. The operating shaft includes an insertion section and a shaft section. The insertion section is inserted into the operating body when the operating body moves along the first direction. The insertion section is engaged with the operating body when the operating body rotates on an axis extending along the first direction. The shaft section extends from the insertion section toward away from the operating body along the first direction. The spring is disposed between the operating body and the operating shaft compressively along the first direction. The housing includes multiple projections arranged in a ring shape at the center of the bottom face thereof. Each one of the projections is defined by two faces crossing at the top of the projection, and the top projects along the first direction and nearer to the operating body. The housing is fixed to the cover. The ribs include end sections confronting the bottom face of the housing, and multiple saw-tooth sections are formed on the end sections. A reciprocal movement of the operating body along the first direction allows the cam section of the rotary body to go with any one of the projections and any one of the saw-tooth sections sequentially in this order, whereby the rotary body rotates relative to the operating body. When the cam section is engaged between adjacent two of the saw-tooth sections, the operating body is locked at a first position. When the cam section moves in the groove so as to be away from the housing, the operating body is held at a second position farther than the first position from the housing. The input device includes the push & lock unit discussed above and a rotary-type electronic component mounted on the shaft section of the operating shaft.

DETAIL DESCRIPTION OF PREFERRED EMBODIMENTS

Prior to demonstrating the exemplary embodiments, a related input device and problems thereof to be solved are described with reference to FIG. 8, which is a perspective view of the related input device. This input device includes wired board 1, rotary-type electronic component 2, and operating body 3. Wired board 1 has multiple wiring patterns (not shown) on both of the upper and lower faces. Rotary-type electronic component 2, e.g. a variable resistor or an encoder, is mounted on wired board 1. Operating body 3 made of insulating resin is mounted on a rotary shaft (not shown) of rotary-type electronic component 2.

The input device discussed above is installed on, e.g. an instrument panel in front of a driver's seat such that operating body 3 projects from panel 4 to this side. Rotary-type electronic component 2 is electrically connected to an electronic circuit (not shown) of the car via a connector and/or a lead-wire (not shown).

When a driver rotates operating body 3 with his or her finger and thumb, a resistance value of rotary-type electronic component 2 changes or an electrical contact is made or broken between switch contact points. An electric signal produced in rotary-type electronic component 2 is supplied to the electronic circuit of the car, whereby, e.g. an illuminating angle of the headlights is changed. The input device is thus installed at a place, e.g. on the instrument panel, accessible to the driver, for the driver to operate operating body 3. The driver thus can operate easily a variety of devices installed in the car.

Figure 8:
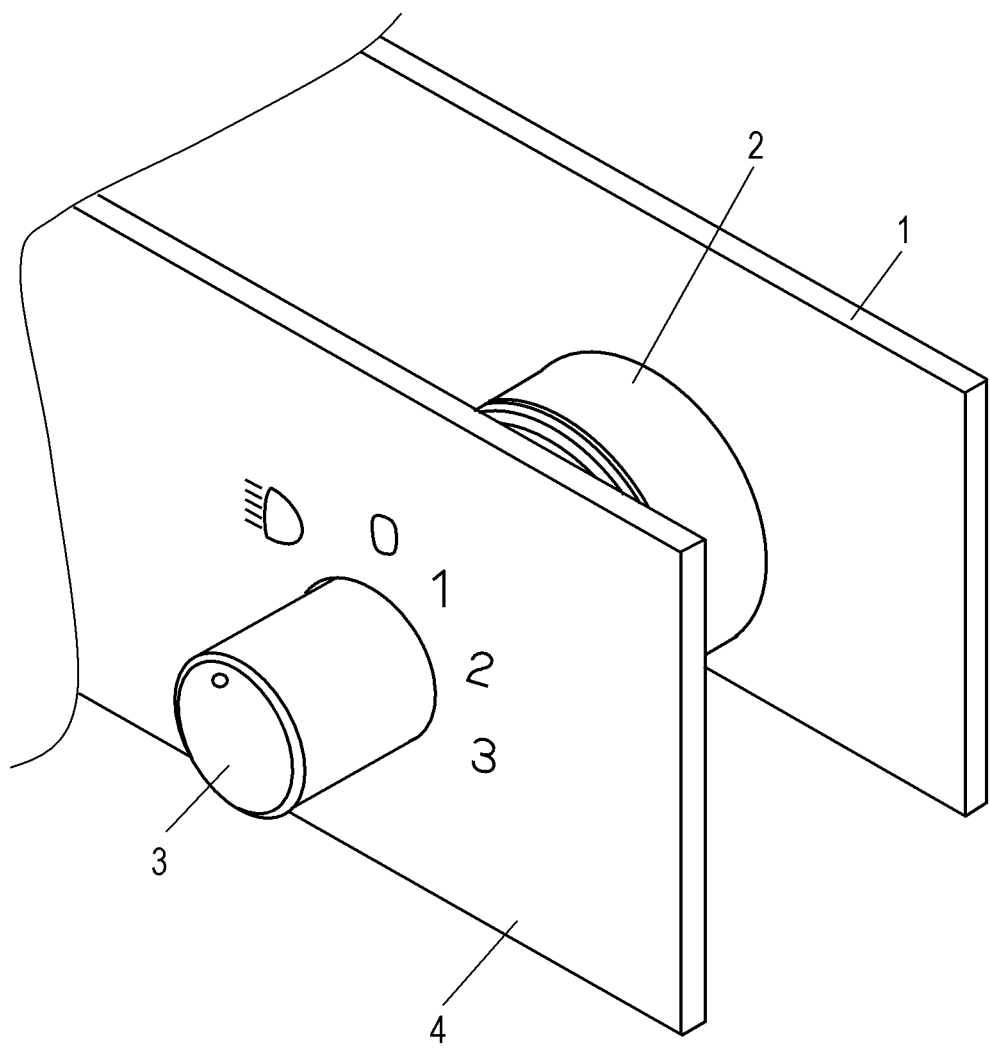
FIG. 8 is a perspective view of a related input device.

However, the related input device shown in FIG. 8 includes operating body 3 always projecting from panel 4 by approx. 10 mm so that a user can rotate it with his or her finger and thumb. When the user tries to operate another button or knob disposed on panel 4, the finger or thumb touches operating body 3 by mistake, which sometimes causes an operating error.

Exemplary Embodiment

Figure 1:
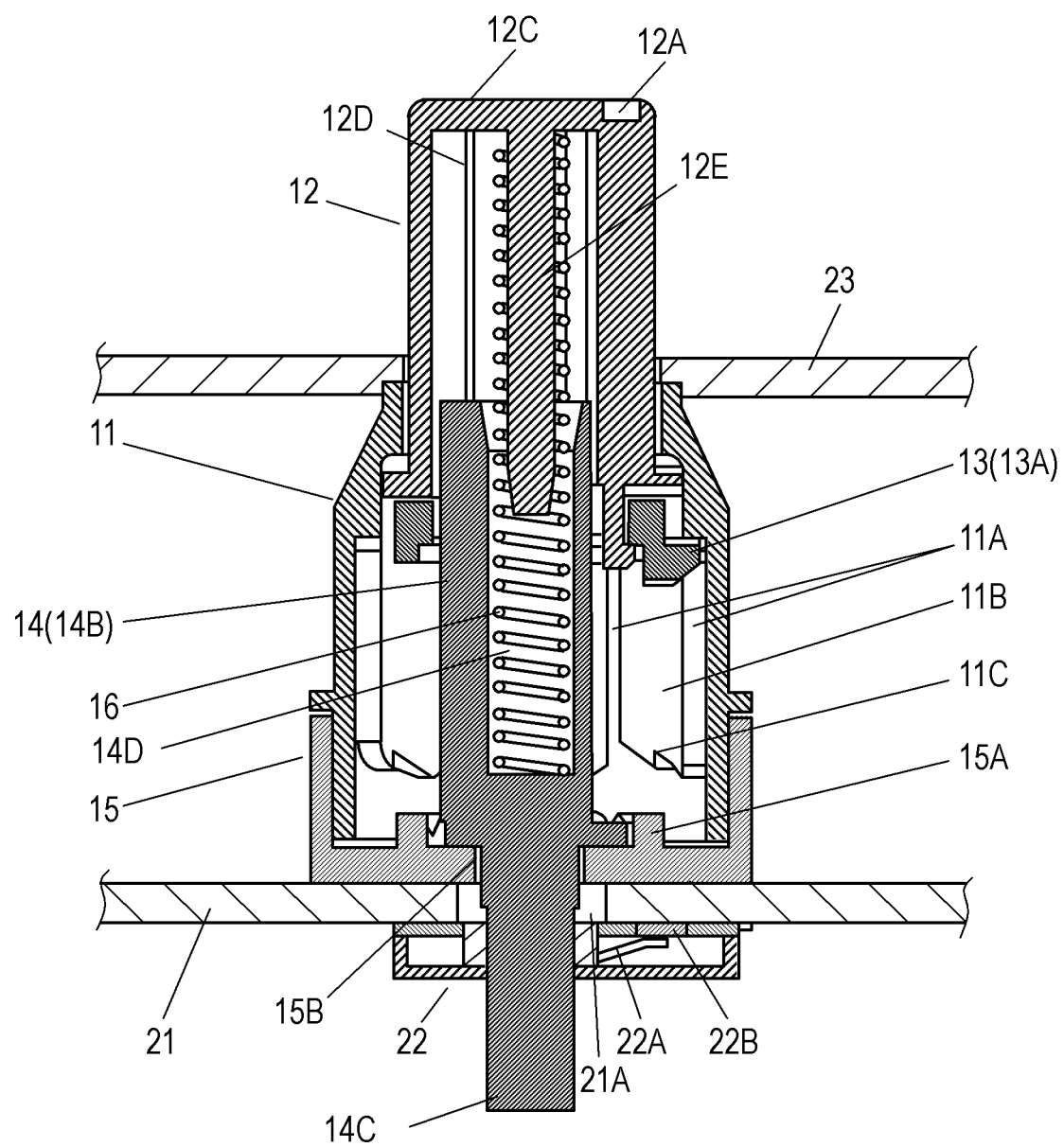
FIG. 1 is a sectional view of an input device in accordance with an embodiment.
Figure 2:
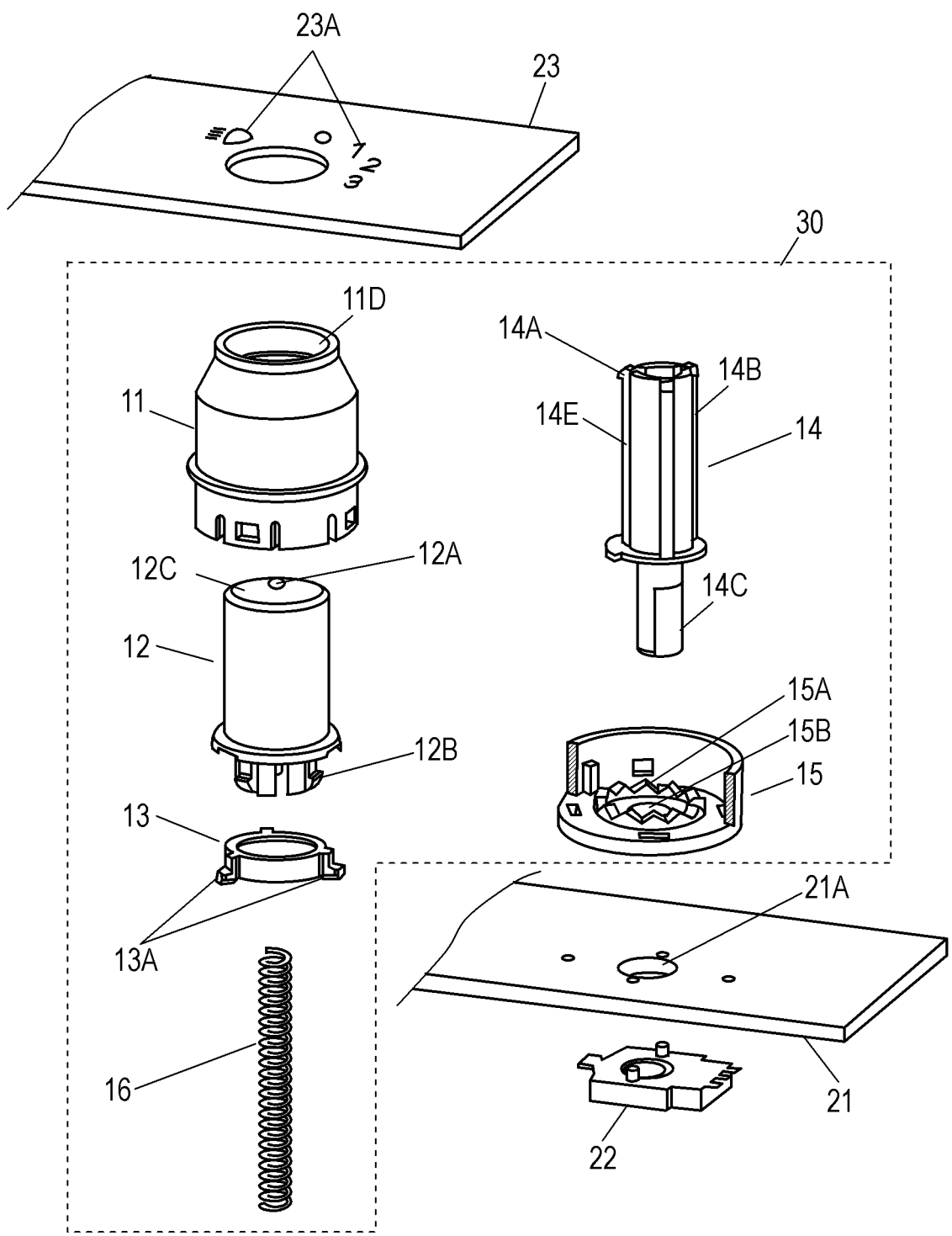
FIG. 2 is an exploded perspective view of the input device shown in FIG. 1.

An embodiment is demonstrated hereinafter with reference to the accompanying drawings. FIG. 1 and FIG. 2 are a sectional view and an exploded perspective view of an input device in accordance with the embodiment. This input device includes push & lock unit 30, and rotary-type electronic component 22. Push & lock unit 30 includes cylindrical cover 11, hollow operating body 12, ring-shaped rotary body 13, operating shaft 14, spring 16, and housing 15. In the following description, positional relations are expressed by using the terms of up, down, or the like; however, those terms indicate relative positional relations and they do not indicate a vertical direction.

Cover 11 has opening 11D. Operating body 12 is accommodated inside cover 11 along a first direction (up-down direction) movably. Operating body 12 has push face 12C projecting from opening 11D of cover 11. Rotary body 13 is mounted rotatably on operating body 12 at an opposite end to push face 12C. Rotary body 13 has cam section 13A projecting outward from the outer periphery thereof.

Operating shaft 14 includes insertion section 14B and shaft section 14C. Insertion section 14B is inserted inside operating body 12 when operating body 12 moves along the first direction. Shaft section 14C extends from insertion section 14B toward further from operating body 12 along the first direction. Spring 16 is disposed between operating body 12 and operating shaft 14 in a compressible manner along the first direction. Housing 15 is fixed to cover 11, and includes multiple projections 15A arranged in a ring shape at the center of the bottom face thereof. Rotary-type electronic component 22 is mounted on shaft section 14C of operating shaft 14.

Cover 11 is made of insulating resin, e.g. polyethylene terephthalate or ABS (acrylonitrile butadiene styrene). Operating body 12 is also made of insulating resin, e.g. ABS, and its top face, namely, push face 12C, has dot-shaped mark 12A formed thereon. An upper section of operating body 12 stays projecting from opening 11D of housing 11 before push face 12C is pushed. Operating body 12 is accommodated in housing 11 movably up and down. Groove 12D extending along the first direction is formed on an inner wall of operating body 12.

Rotary body 13 is made of insulating resin, e.g. polyoxymethylene, and is mounted rotatably on an underside of operating body 12. Rotary body 13 includes multiple cam sections 13A shaped like trapezoids and formed on its outer periphery, and cam sections 13A project outward. Cam sections 13A are inserted into grooves 11A formed on the inner wall of cover 11.

Operating shaft 14 is made of insulating resin, e.g. polybutylene terephthalate or ABS. Housing 15 is also made of insulating resin. Housing 15 is provided with through-hole 15B extending through the center of the bottom face thereof, and a lower end of operating shaft 14, i.e. shaft section 14C, is inserted into and penetrates through-hole 15B. Operating shaft 14 is thus disposed on the bottom face of housing 15. Operating shaft 14 has ribs 14E, extending along the first direction, at insertion section 14B.

Spring 16 is made of steel wire or the like wound in a coil shape. Spring 16 is mounted between the underside of operating body 12 and the bottom of center hole 14D in a somewhat compressed state.

Push & lock unit 30 discussed above is disposed on a top face of wired board 21 such that shaft section 14C of operating shaft 14 penetrates through-hole 21A punched through wired board 21 made of paper phenol or glass epoxy. Wired board 21 includes multiple wiring patterns (not shown) formed of copper foil on both the faces.

Rotary-type electronic component 22 is a variable resistor, an encoder or the like, and includes therein movable contact 22A made of conductive metal and fixed contact 22B made of resistance element or conductive metal. Shaft section 14C of operating shaft 14 is mounted on a rotary shaft of rotary-type electronic component 22 mounted on the underside of wired board 21. The input device is thus constructed.

Figure 3A:
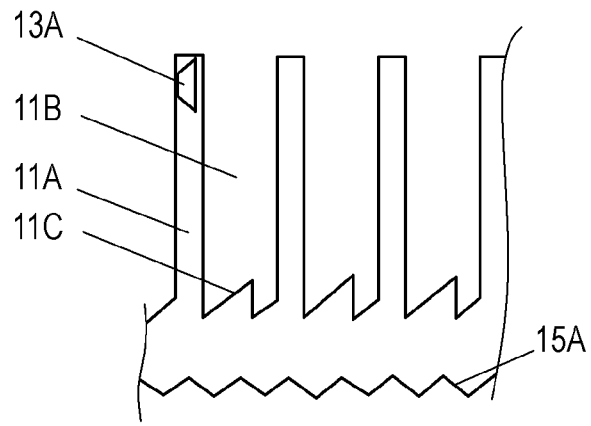
FIG. 3A is a lateral view of a part of inside of the input device shown in FIG. 1.
Figure 3B:
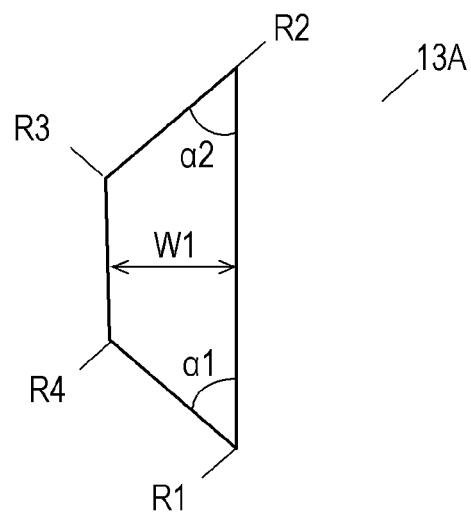
FIG. 3B is an enlarged view of a cam section shown in FIG. 3A.

Next, grooves 11A, ribs 11B, and saw-tooth sections 11C formed on the inner wall of cover 11 as well as projections 15A formed at the center of bottom face of housing 15, cam sections 13A provided to rotary body 13 are described hereinafter with reference to FIG. 3A to FIG. 3C. FIG. 3A is a lateral view of a part of inside of the input device shown in FIG. 1.

On the inner wall of cover 11, multiple grooves 11A and ribs 11B are formed alternately such that they extend vertically, i.e. along the first direction, in the inner circumferential direction. Each one of ribs 11B includes saw-tooth section 11C on its underside. In other words, ribs 11B have end sections confronting the bottom face of housing 15, and multiple saw-tooth sections 11C are formed on the end sections. In an initial state where operating body 12 is not yet pushed, cam section 13A of rotary body 13 is inserted in groove 11A.

Next, groove 11A, saw-tooth section 11C, projection 15A, and cam section 13A are detailed hereinafter with reference to FIG. 3B and FIG. 3C. FIG. 3B is an enlarged view of cam section 13A, and FIG. 3C is an enlarged view of saw-tooth section 11C and projection 15A. As FIG. 3B shows, cam section 13A shapes like a trapezoid viewed laterally, and has four tops R1 to R4. Side R1-R2 is generally parallel with side R3-R4. As shown in FIG. 3A, cam section 13A is disposed in groove 11A such that side R1-R2 and side R3-R4 run generally along the first direction. Width W1 between side R1-R2 and side R3-R4 is somewhat smaller than width W2 of groove 11A. Slant R3-R2 extends upward to top R3 and slant R4-R1 extends downward to top R1 as shown in FIG. 3B. In other words, both of slant R3-R2 and slant R4-R1 are formed such that the height of cam section 13A along the first direction increases to up and down in the width direction.

Figure 3C:
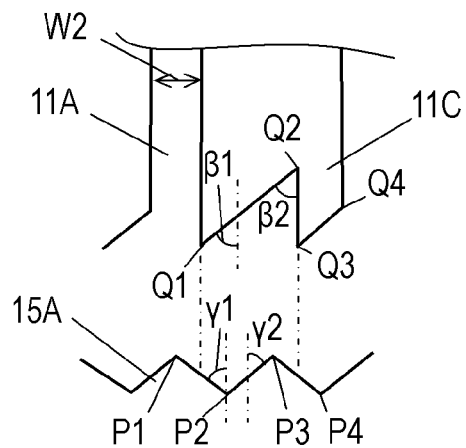
FIG. 3C is an enlarged view of a saw-tooth sections and projections shown in FIG. 3A.

As shown in FIG. 3C, each of projections 15A is defined by two faces crossing each other at the top of the projection, and the top projects toward operating body 12 along the first direction. To be more specific, projection 15A is defined by slant P2-P3 and slant P3-P4 crossing each other at top P3, and shapes like a triangle or a pentagon viewed laterally. Top P3 projects toward operating body 12 along the first direction. In other words, slant P2-P3 rises from left to right, and slant P3-P4 falls from left to right. Multiple projections 15A discussed above are disposed in a ring shape at the bottom center of hosing 15. Top P1 corresponds to top P3, and accordingly, slant P1-P2 corresponds to slant P3-P4.

Saw-tooth section 11C provided at the underside of rib 11B is formed of top Q1, i.e. a first lower end of groove 11A, top Q2 located over top Q1, top Q3 located under top Q2, and top Q4, i.e. a second lower end of adjacent groove 11A. Slant Q1-Q2 thus extends upward to top Q2. Plane Q2-Q3 runs parallel with the first direction, or it runs somewhat slantingly to top Q3 so that top Q3 is located slightly to the right from top Q2. Slant Q3-Q4 extends upward to top Q4. In other words, slant Q1-Q2 and slant Q3-Q4 rise from left to right, and plane Q2-Q3 runs parallel with a vertical direction or falls slightly from left to right.

Next, positional relations among the structural elements discussed above are described hereinafter. Top P1 of projection 15A is located under groove 11A within a range of width W2 of groove 11A, so that top R1 of cam section 13A confronts slant P1-P2, and an extension plane of the rib wall forming groove 11A and passing top Q1 of rib 11B crosses slant P1-P2. Slant P2-P3 confronts slant Q1-Q2 of saw-tooth section 11C. An extension plane of plane Q2-Q3 crosses slant P3-P4, and top P4 confronts slant Q3-Q4.

Assume that side R1-R2 and slant R4-R1 form angle α1, side R1-R2 and slant R3-R2 form angle α2, slant Q1-Q2 and the first angle form angle 131, and slant Q1-Q2 and plane Q2-Q3 form angle 132. Also assume that slant P1-P2 (P3-P4) and the first direction form angle γ1, and slant P2-P3 and the first direction form angle γ2. In the foregoing definitions, cam section 15A, saw-tooth section 11C, and projection 15A are formed to meet the following relations: $\alpha1 \leq \gamma1$, $\alpha2 \leq \beta1$, and $\alpha2 \leq \beta2$.

Cam section 13A is not necessarily a trapezoid, but it can be a polygon having even number tops such as hexagon or octagon provided that the foregoing relations are satisfied.

Projection 15A is not necessarily an obtuse triangle as shown in FIG. 3C, but it can be a saw-tooth shape, i.e. angle γ2 can be 0 (zero) degree or close to 0 degree, provided that the foregoing relations are satisfied.

Figure 4:
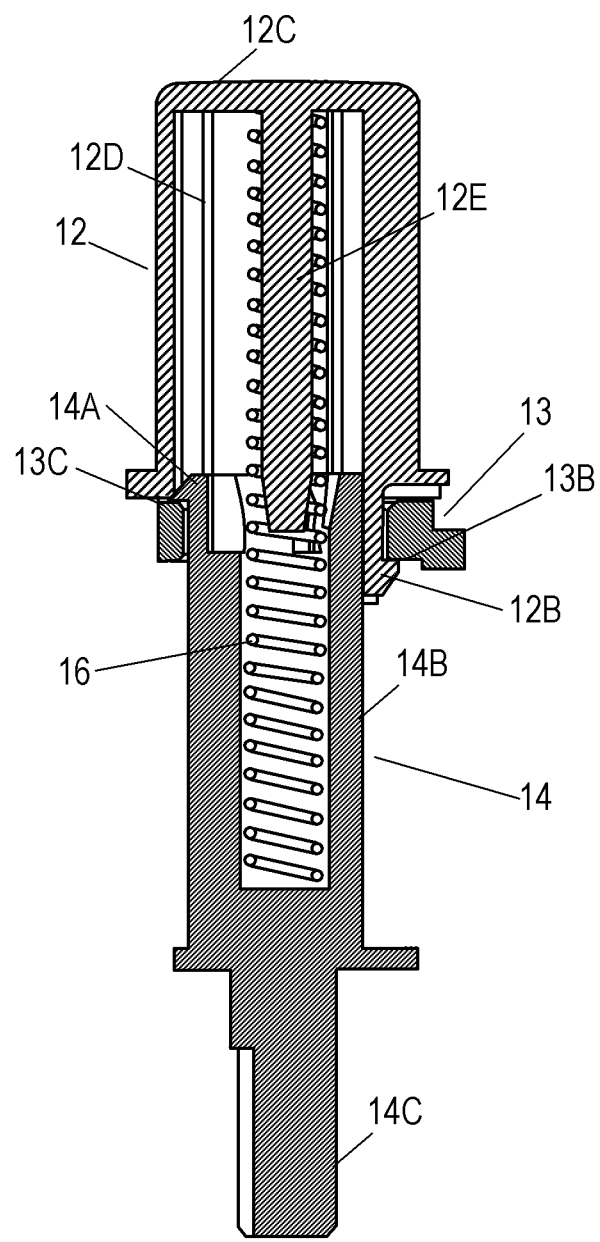
FIG. 4 is a sectional view of a part of the input device shown in FIG. 1.

The foregoing push & lock unit 30 and the input device can be simply assembled with the following structure that is demonstrated hereinafter with reference to FIG. 4, which is a partial sectional view of the input device shown in FIG. 1.

Rotary body 13 includes first face 13B closer to housing 15 than second face 13C disposed oppositely to first face 13B. Engaging hook 12B is provided to operating body 12 at an opposite end to push face 12C. Engaging hook 14A is provided to operating shaft 14 at an opposite end to shaft section 14C of insertion section 14B. When push & lock unit 30 or the input device is assembled, operating body 12, rotary body 13, operating shaft 14 and spring 16 can be integrally assembled with the aid of engaging hook 12B formed on the lower end of operating body 12 and engaging hook 14A formed on the upper end of operating shaft 14. Push & lock unit 30 or the input device can be thus assembled with ease.

Here is an example way of how to assemble the input device. First, engaging hook 12B is engaged with first face 13B of rotary body 13, thereby mounting rotary body 13 to operating body 12. Then, spring 16 is disposed between the underside of operating body 12 and the bottom in center hole 14D of operating shaft 14 in a somewhat compressed state. To be more specific, spring 16 is mounted on spring-guide 12E that extends inside operating body 12 from the rear side of push face 12C along the first direction. Then, ribs 14E of operating shaft 14 is respectively inserted into grooves 12D formed on inner wall of operating body 12 while insertion section 14B is inserted inside operating body 12. Engaging hook 14A is engaged with second face 13C of rotary body 13. The structural elements discussed above are thus integrated temporarily into an assembled unit as shown in FIG. 4.

Next, cover 11 and housing 15 are combined with this assembled unit, thereby completing push & lock unit 30. The foregoing way of assembly proves that alignments among each one of the structural elements can be done with ease, and prevents spring 16 from disengaging.

The input device thus constructed is mounted to, e.g. the instrument panel in front of the driver's seat with operating body 12 so as to protrude upward from panel 23, of which top face is provided with a display section including letters and signs (not shown), as shown in FIGS. 1 and 2. Rotary-type electronic component 22 is electrically connected to an electronic circuit (not shown) of an automobile via wired board 21, connectors, and lead-wires (not shown).

Next, operations of push & lock unit 30 and the input device using push & lock unit 30 are demonstrated hereinafter with reference to FIGS. 1 and 2, and FIGS. 5A to 7E. FIGS. 5A to 5E and FIGS. 7A to 7E are lateral views of the inside in parts for illustrating the operation of the input device. FIG. 6 is a sectional view of the input device, in a locked state, shown in FIG. 1.

The case when a user rotates operating body 12 protruding from panel 23 with his or her finger and thumb is demonstrated in the first place hereinafter. Since ribs 14E of operating shaft 14 engage with grooves 12D of operating body 12, a rotation of operating body 12 allows operating shaft 14 to rotate. In other words, insertion section 14B engages with operating body 12 when rotating on an axis along the first direction.

The rotation of operating shaft 14 allows shaft section 14C to rotate the rotary shaft of rotary-type electronic component 22. As a result, a tip of movable contact 22A elastically slides on fixed contact 22B, thereby changing a resistance value of component 22, or whereby the switch contacts are electrically contacted or separated. The electric signal produced by this operation is supplied to the electronic circuit of the automobile, and is used for, e.g. changing an illuminating angle of the headlights.

After the forgoing rotating operation, when the user pushes operating body 12 with his or her finger, operating body 12 moves downward while it compresses spring 16. At the same time, rotary body 13 mounted rotatably on the lower end of operating body 12 also moves downward, so that multiple cam sections 13A shown in FIG. 5A move downward within grooves 11A.

Figure 5A:
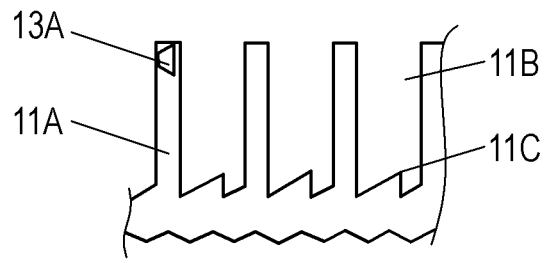
FIG. 5A-FIG. 5E show lateral views of parts of inside of the input device shown in FIG. 1 for illustrating an operation of the input device.
Figure 5B:
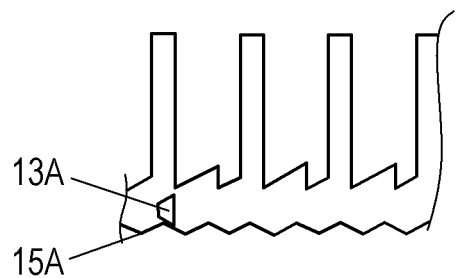
Figure 5C:
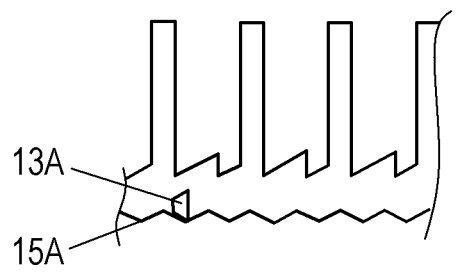
Figure 6:
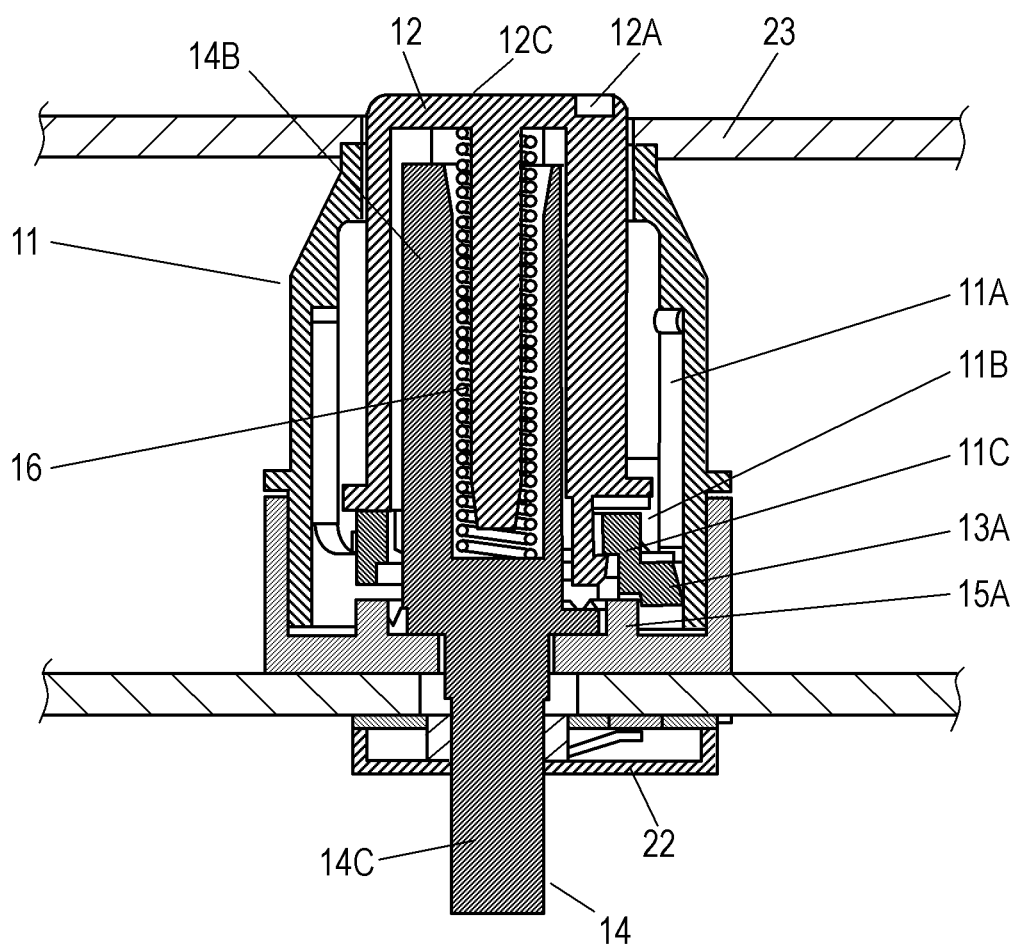
FIG. 6 is a sectional view illustrating the input device, shown in FIG. 1, in a locked state.

When operating body 12 is pushed and moves downward by a given distance, e.g. approx. 10 mm, cam section 13A contacts projection 15A as shown in FIG. 5B, and then cam section 13A slides on the slant of projection 15A as shown in FIG. 5C. This sliding of cam section 13A allows rotary body 13 to rotate. When cam section 13A arrives at the top (top P2 in FIG. 3C), i.e. the bottom between two projections 15A, operating body 12 falls in a state where it cannot be pushed any further.

Figure 5D:
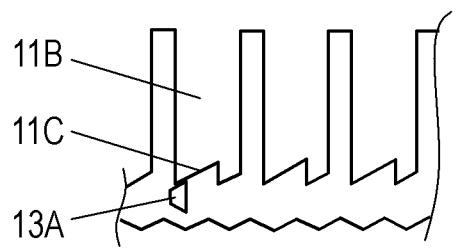
Figure 5E:
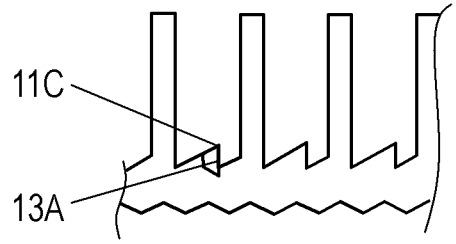

Thereafter, when the user removes his or her finger from operating body 12, resilient restoring force of spring 16 allows operating body 12 and rotary body 13 to move upward, and cam section 13A contacts the slant of saw-tooth section 11C as shown in FIG. 5D. Since rotary body 13 is urged upward by spring 16, cam section 13A slides on the slant of saw-tooth section 11C as shown in FIG. 5E. The sliding of cam section 13A allows rotary body 13 to rotate. Cam section 13A moves on the slant of saw-tooth section 11C and arrives at the upper top (top Q2 in FIG. 3C), then operating body 12 and rotary body 13 stop moving upward. As a result, as shown in FIG. 6, operating body 12 is held with push face 12C slightly projecting from a top face of panel 23. In other words, operating body 12 and rotary body 13 are locked to each other at this position. As discussed above, when cam section 13A is engaged with two adjacent saw-tooth sections 11C among the multiple saw-tooth sections, operating body 12 is locked at a first position.

Figure 7A:
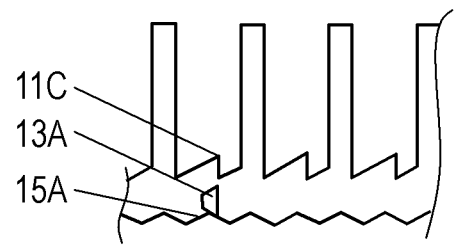
FIG. 7A-7E show lateral views of parts of inside of the input device shown in FIG. 1 for illustrating an operation of the input device.
Figure 7B:
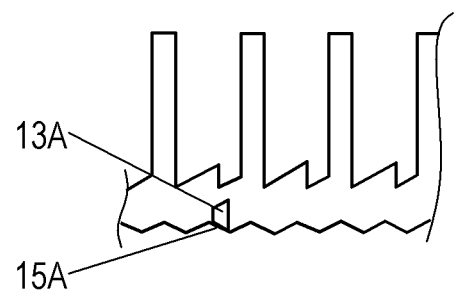

If the user wants to rotate operating body 12 again, the user pushes again operating body 12 staying in a locked state, then as shown in FIG. 7A, cam section 13A disengages from saw-tooth section 11C. Thus, operating body 12 and rotary body 13 are unlocked, and cam section 13A contacts next projection 15A and slides on the slant as shown in FIG. 7B. The sliding of cam section 13A allows rotary body 13 to rotate. When cam section 13A arrives at the top, i.e. the bottom between the next two projections 15A, operating body 12 falls in a state where operating body 12 cannot be pushed any further.

Figure 7C:
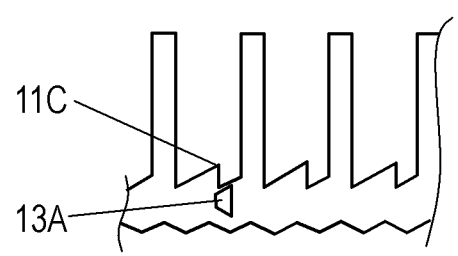
Figure 7D:
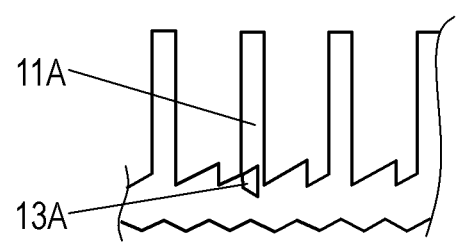
Figure 7E:
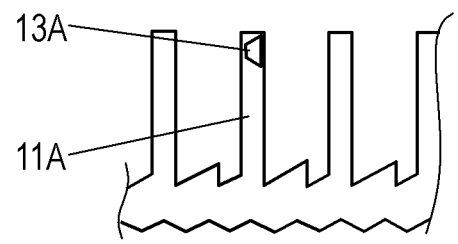

In this state, when the user removes his or her finger from operating body 12, spring 16 allows operating body 12 and rotary body to move upward, and as shown in FIG. 7C, cam section 13A contacts the slant of saw-tooth section 11C. Then cam section 11C slides on the slant, and rotary body 13 rotates, and as shown in FIG. 7D, cam section 13A moves below the next groove 11A. Thereafter, cam section 13A moves in groove 11A upward as shown in FIG. 7E. Operating body 12 thus restores to the original state, i.e. it protrudes from the top face of panel 23 as shown in FIG. 1. As discussed above, when cam section 13A moves in groove 11A along a direction farther away from housing 15, operating body 12 is held at a second position farther from housing 15 than the first position.

In other words, the input device is positioned at a place, e.g. on the instrument panel, accessible to a driver, and the driver rotates the operating body 12, thereby operating a variety of functions of a vehicle with ease. In the case of not rotating the operating body 12, the driver pushes operating body 12, which is then locked at a position where push face 12C is almost flush with the top face of panel 23. In this state, when the driver operates another push button or a knob on panel 23, this locked state prevents the driver from touching the operating body 12 by mistake, which sometimes causes a wrong operation.

To be more specific, multiple cam sections 13A formed on the outer periphery of rotary body 13 rotate and move in response to the up and down movement (reciprocal movement along the first direction) of operating body 12 among grooves 11A on the inner wall of cover 11, saw-tooth sections 11C on the underside of ribs 11B, and projections 15A on the bottom center of housing 15. Cam sections 13A elastically slide on saw-tooth sections 11C and projections 15A sequentially, so that rotary body 13 rotates. This operation allows operating body 12 to be held with ease in a first state where operating body 12 protrudes from panel 23 to the outside or in a second state where push face 12C of operating body 12 is locked almost flush with the outer face of panel 23. The user can rotate operating body 12 held in the first state with ease, but cannot rotate it held in the second state.

A push allows rotary body 13 to rotate, however, it moves operating body 12 only up and down, i.e. operating body 12 is not rotated by the push, so that mark 12A formed on push face 12C do not deviate from the counterparts marked on display section 23A of panel 23. As a result, the user can operate rotary-type electronic component 22 with more ease and free from a wrong operation.

On top of that, when the user pushes operating body 12, each one of cam sections 13A elastically slides on projection 15A and rotates. On the other hand, when operating body 12 restores to the upper position with the aid of spring 16, cam section 13A elastically contacts with and slides on saw-tooth section 11C while load of spring 16 is reduced. This operation allows lowering the impact produced when cam section 13A is brought into contact with projection 15A or saw-tooth section 11C, and also damping an operating sound.

A heart-cam mechanism is widely known as a push & lock unit, which can be locked by a push. This heart-cam mechanism includes a heart-shaped cam in the operating body, and a pin moves in the cam in response to the up and down movement of the operating body. However, in the case of push & lock unit 30 employing cam sections 13A formed on the outer periphery of rotary body 13, each one of cam sections 13A elastically contacts saw-tooth section 11C of cover 11 and projection 15A of housing 15 sequentially. This structure needs a smaller number of components than the heart-cam mechanism, and can be thus assembled simply.

Multiple cam sections 13A are formed at intervals of equal angle on rotary body 13, and each one of cam sections 13A elastically contacts multiple grooves 11A, projections 15A, and saw-tooth sections 11A, so that push & lock unit 30 can be locked or released from the lock. This structure allows preventing operating body 12 from tilting, and allows achieving a stable operation comparing with another push & lock unit that is locked or released with the heart-cum mechanism formed on one of lateral faces of the operating body.

The embodiment proves that cam sections 13A, formed on the outer periphery of rotary body 13 provided to the underside of operating body 12, elastically contact with saw-tooth sections 11C formed on the lower ends of ribs 11B on the inner wall of cover 11 and projections 15A formed on the bottom center of housing 15 sequentially in response to the up and down movement of operating body 12, thereby rotating rotary body 13. Push & lock unit 30 is thus constructed. Rotary-type electronic component 22 is mounted on shaft section 14C of operating shaft 14 of push & lock unit 30. When the user pushes operating body 12, which is then locked such that push face 12C becomes almost flush with the outer face of panel 23. This structure allows preventing the user from touching the operating body 12 with finger and thumb by mistake, and allows avoiding a wrong operation. On top of that, when the user pushes operating body 12 once more, operating body 12 is released from the lock and restores to an initial state, i.e. operating body 12 stays projecting from panel 23. The user thus can operate rotary-type electronic component 22 easily with the aid of operating body 12. As described, easy-to-use and reliable push & lock unit 30 as well as the input device employing push & lock unit 30 can be thus obtained.

In the foregoing descriptions, cam section 13A moves rightward, which allows rotary body 13 to rotate as shown in FIGS. 5A to 5E and FIGS. 7A to 7E; however, cam section 13A can move leftward to rotate rotary body 13. In this case, slant Q1-Q2 and slant Q3-Q4 of saw-tooth section 11C shown in FIG. 3C should fall from left to right, and the shape of cam section 13A should be reversed laterally.

As discussed above, the push & lock unit and the input device using the same unit according to the embodiment are easy-to-use and reliable in operation. They are useful mainly for operating a variety of electronic devices installed in automobiles.

What is claimed is:
1. A push & lock unit comprising:
 a cylindrical cover having an opening, a plurality of grooves and a plurality of ribs alternately disposed along an inner circumferential direction of the cover;
 a hollow operating body accommodated in the cover movably along a first direction, and having a push face projecting from the opening of the cover;
 a ring-shaped rotary body mounted on the operating body at an end section opposite to the push face, and having a cam section projecting outward from an outer wall of the rotary body;
 an operating shaft including an insertion section to be inserted inside the operating body in response to a movement of the operating body along the first direction and to be engaged with the operating body when the operating body rotates on an axis along the first direction, and a shaft section extending from the insertion section so as to be away from the operating body along the first direction;
 a spring disposed between the operating body and the operating shaft such that the spring can be compressed along the first direction; and
 a housing including a plurality of projections disposed in a ring-shape on a center of a bottom face thereof, and each of the projections is defined by two faces crossing each other at a top of each of the projections, and the top projecting nearer to the operating body along the first direction, and the housing being fixed to the cover, wherein each one of the ribs has an end section confronting the bottom face of the housing and a plurality of saw-tooth sections are formed on the end section, wherein the cam section of the rotary body travels along any one of the plurality of projections and any one of the plurality of saw-tooth sections sequentially in response to a reciprocal movement of the operating body along the first direction, so that the rotary body rotates relative to the operating body, and wherein when the cam section is engaged between two of the saw-tooth sections, adjacent to each other, among the plurality of saw-tooth sections, the operating body is locked at a first position, and when the cam section moves in the groove along a direction farther from the housing, the operating body is held at a second position farther from the housing than the first position.

2. The push & lock unit of claim 1, wherein the rotary body includes a first face closer to the housing in the first direction and a second face opposite to the first face, wherein the operating body includes an engaging hook, disposed at an end opposite to the push face, the engaging hook being configured to be engaged with the first face, and wherein the operating shaft includes an engaging hook, disposed at an end section opposite to the shaft section in the insertion section, the engaging hook being configured to be engaged with the second face.

3. An input device comprising:

a push & lock unit including:

a cylindrical cover having an opening, a plurality of grooves and a plurality of ribs alternately disposed along an inner circumferential direction of the cover;

a hollow operating body accommodated in the cover movably along a first direction, and having a push face projecting from the opening of the cover;

a ring-shaped rotary body mounted on the operating body at an end section opposite to the push face, and having a cam section projecting outward from an outer wall of the rotary body;

an operating shaft including an insertion section to be inserted inside the operating body in response to a movement of the operating body along the first direction and to be engaged with the operating body when the operating body rotates on an axis along the first direction, and a shaft section extending from the insertion section so as to be away from the operating body along the first direction;

a spring disposed between the operating body and the operating shaft such that the spring can be compressed along the first direction; and a housing including a plurality of projections disposed in a ring-shape on a center of a bottom face thereof, each of the projections is defined by two faces crossing each other at a top of each of the projections, and the top projecting nearer to the operating body along the first direction, and the housing being fixed to the cover, wherein each one of the ribs has an end section confronting the bottom face of the housing and a plurality of saw-tooth sections are formed on the end section, wherein the cam section of the rotary body travels along any one of the plurality of projections and any one of the plurality of saw-tooth sections sequentially in response to a reciprocal movement of the operating body along the first direction, so that the rotary body rotates relative to the operating body, and wherein when the cam section is engaged between two of the saw-tooth sections, adjacent to each other, among the plurality of saw-tooth sections, the operating body is locked at a first position, and when the cam section moves in the groove along a direction farther from the housing, the operating body is held at a second position farther from the housing than the first position, and a rotary-type electronic component mounted on the shaft section of the operating shaft of the push & lock unit.

* * * * *